United States Patent [19]

Stoerk et al.

[11] Patent Number: 4,557,555

[45] Date of Patent: Dec. 10, 1985

[54] SWITCH FOR OPTICAL LIGHT WAVEGUIDES

[75] Inventors: Peter Stoerk, Poecking; Günter Thom, Gauting, both of Fed. Rep. of Germany

[73] Assignee: Siemens Aktiengesellschaft, Berlin & Munich, Fed. Rep. of Germany

[21] Appl. No.: 562,905

[22] Filed: Feb. 1, 1983

[30] Foreign Application Priority Data

Feb. 5, 1982 [DE] Fed. Rep. of Germany ........ 3203930

[51] Int. Cl.$^4$ ................................................. G02B 5/14
[52] U.S. Cl. .................................................... 350/96.20
[58] Field of Search ........................... 350/96.20, 96.21

[56] References Cited

U.S. PATENT DOCUMENTS

| 4,152,043 | 5/1979 | Albanese | 350/96.20 |
| 4,189,206 | 2/1980 | Terai et al. | 350/96.20 |
| 4,415,228 | 11/1983 | Stanley | 350/96.20 |

*Primary Examiner*—William L. Sikes
*Assistant Examiner*—Akm E. Ullah
*Attorney, Agent, or Firm*—Hill, Van Santen, Steadman & Simpson

[57] ABSTRACT

A switch for coupling and uncoupling a first waveguide from at least a second waveguide characterized by the switch having a member holding the first waveguide in a fixed position in a switch housing and a movable support part for supporting the second waveguide and being movable from a position with the waveguides in a coupling relationship to a position with the waveguides being uncoupled, the support part being connected to the switch housing by at least one flexible web having a bending axis extending parallel to the axis of the second waveguide. Preferably, each of the flexible webs is connected to a second flexible web extending at right angles thereto so that the movable support part can be moved relatiive to the first waveguide in two planes extending at right angles to each other.

11 Claims, 3 Drawing Figures

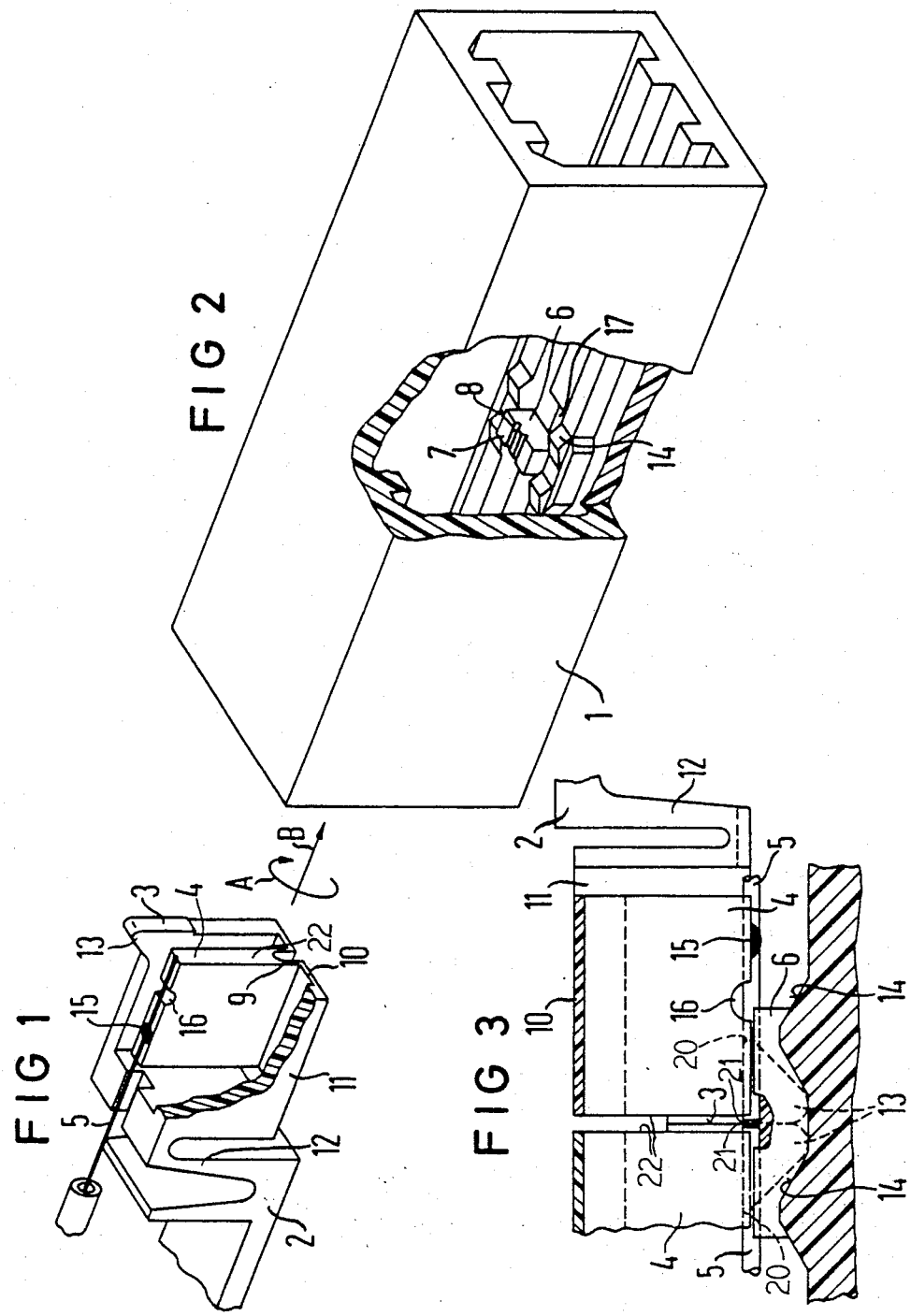

SWITCH FOR OPTICAL LIGHT WAVEGUIDES

BACKGROUND OF THE INVENTION

The present invention is directed to a switch for coupling and uncoupling a pair of glass waveguides whose ends are disposed in alignment with one another while in their coupled condition.

A switch for coupling and uncoupling a pair of waveguides whose ends are aligned with one another in the coupled condition is disclosed in German OS No. 28 10 858. In this switch, a movable light waveguide is secured to a transversely deflectable switch tongue and a stationary waveguide of the switch is held in a fixed carrier part of the switch. The switch tongue extends in a longitudinal direction of the end of the movable light waveguide. The end of the light waveguide is moved back and forth between the two switch positions by means of bending the switch tongue. Thereby, a fictitious bending axis is perpendicular to the end of the light waveguide. Thus, the switch tongue is tilted relative to the fixed light waveguide end during a bending of the tongue. As a result, it is difficult if not impossible to bring the end section of the movable light waveguide end into a precise, bend-free alignment with the end of the fixed light waveguide. The buckling of the fiber axis already effects a coupling attenuation even given a high degree of positional coincidence of the end faces of the light waveguides. Tilting, however, also complicates the precise centering of the end faces of the fibers relative to one another.

SUMMARY OF THE INVENTION

The present invention is directed to providing a switch for light waveguides wherein a precise alignment of the two light waveguide ends is enabled without a high cost for both the manufacture of the switch and the adjustment of the switch.

This object is attained by an improvement in the switch for coupling and uncoupling a first waveguide from at least a second waveguide, said switch having means for holding the first waveguide in a fixed position in a switch housing and movable means including a support part for moving the second waveguide between the first position and said housing optically coupled to the first waveguide and a second position uncoupled from said first waveguide. The improvement comprises said movable means including said support part being connected to the switch housing by at least one flexible web having a bending axis extending parallel to the axis of the second light waveguide adjacent the end thereof.

As a result of the parallel bending axis, the movement of the support part will occur parallel to the axis of the light waveguide so that a tilting or buckling of the fiber forming the light waveguide is avoided in both switch positions. As a result, the coupling losses are low even given a changeover switch having two stationary light waveguide ends. The precise alignment of the waveguide ends is facilitated by means of the movement parallel to the axis of the waveguides.

Preferably, the switch housing includes a fixed carrier part having a surface provided with longitudinally extending channels which will receive the first waveguide and the support part is preferably deflectable both perpendicular and parallel relative to the surface of the fixed carrier part. While the flexible web may extend either parallel or perpendicular to the surface of the fixed carrier part, in the preferred embodiment, the support part is connected to the housing by two flexible webs with one web extending parallel to the surface and the other being perpendicular to the surface. Thus, the waveguide on the support part can be moved both in a parallel and a vertical direction to the horizontal surface.

Preferably, the fixed carrier part is positioned on a first coupling part of the switch and the support part or plate is held in a second coupling part and the two coupling parts are plugged into one another with a mutual latch-type arrangement. The support part preferably has a longitudinally extending groove receiving the fiber forming the second waveguide and is provided with an abutment surface which extends slightly past the end of the waveguide. If desired, both the first and second waveguides are carried in support parts which are inserted as plug-like connections into a sleeve-like member which contain the fixed carrier and the first and second waveguides are thus received in a groove in the fixed carrier.

As a result of these additional features, the end of the light waveguide can be lifted out of its longitudinal groove and be laterally displaced and lowered into an adjacent longitudinal groove. When both longitudinal grooves are occupied with the fixed light waveguide ends, then a bi-stable, changeover means occurs whereby a precise alignment of the coupled light waveguide end is assured in both switch positions.

The two-dimensional flexure is realized in a structurally simple manner by utilizing both flexible webs which bend on axes extending parallel to the axis of the fiber but bend in a direction extending at right angles to each other. Axial parallelism of the light waveguide ends is likewise guaranteed in the corresponding deflection motion due to the parallel bending axes of the longitudinally extending flexible webs.

It is possible on the basis of the preferred embodiments to employ the switch as a plug. When the coupling parts are plugged together, the two-dimensional deflectability of the support part enables self-centering of the light waveguide end in the corresponding longitudinal groove. The support for the movable waveguide end can be made accessible from the outside and, for example, an actuation mechanism may engage the support through an opening in the coupling parts.

BRIEF DESCRIPTION OF THE DRAWINGS

FIG. 1 is a perspective view with portions broken away for purposes of illustration of one of the plug parts utilized to form the switch of the present invention;

FIG. 2 is a perspective view of a second plug part with portions broken away of the switch of the present invention with said second part being rotated on its axis by 180°; and FIG. 3 is a partial longitudinal section through two of the coupling parts in the area of the coupling location for two light waveguides after the assembly of the plug parts of FIGS. 1 and 2.

DESCRIPTION OF THE PREFERRED EMBODIMENT

The principles of the present invention are particularly useful in a switch for optically coupling and uncoupling a pair of waveguides 5 (FIG. 3). The switch includes a first coupling part 1 (FIG. 2) which has a sleeve-like configuration. For purposes of better illustration, a second coupling part 2 (FIG. 1) is shown rotated around an axis B by 180° as indicated by the arrow A. The second coupling part 2 has a support part 4 which is provided with a longitudinally extending groove 20 that receives an optical fiber forming the light waveguide 5. The fiber or waveguide 5 is secured in the groove 20 by an adhesive or glue 15. To prevent the adhesive from flowing during the gluing operation into the area immediately adjacent the end of the fiber, a cross-channel 16 is provided in the support part 4.

The first coupling part 1 has a block-like support block member or fixed carrier part 6 which projects from the internal surface of the part and is disposed in the center of the part. The support block member has an upper or bearing surface 7 which is provided with at least one longitudinally extending groove 8. Each of the longitudinal grooves or channels 8 and the longitudinal groove 20 of the support part 4 are designed so that they engage approximately one-half of the cross-section of the waveguide 5 when in a connected condition as illustrated in FIG. 3. In the connected condition of the coupling parts, the surface of the support part 4 which has the light waveguide 5 will overlap the upper surface 7 to approximately the center of the fixed carrier part 6. Thus, the end of the light waveguide 5 is centered in the longitudinal groove or channel 8. The other light waveguide held by a part similar to 2 extending in from the opposite end of the part 1 will also be centered in the channel 8.

The support part 4 is connected to a pair of guide pieces 11 of the part 2 by a pair of vertically extending flexible webs 9 which are connected respectively to a pair of horizontally extending flexible webs 10. Both the webs 9 extend parallel to the end of the waveguide 5 held on the part 4 so that the part 4 can be resiliently deflected in a lateral direction with the axis of the waveguide being maintained or moving parallel. The pair of webs 10 also extend parallel to the end of the light waveguide but at right angles to the webs 9. Thus, the elastic mounting of the part 4 in the guide pieces 11 enables movement both vertically and laterally with the axis of the waveguide 5 remaining substantially parallel. As illustrated, the webs 10 extend between the webs 9 and the guide pieces 11. The guide pieces 11 are connected to the coupling part 2 by a crossridge 12 which extends at right angles relative to light waveguides and allows a bending in a direction transverse to the axis of the waveguide and thus allow a bending of the axis of the waveguide when moving the guide parts 11. Each of the guide pieces 11 adjacent an end thereof is provided with a cam-like projection 13. When the coupling part 2 is inserted into the sleeve or coupling part 1, the cam-like projections 13 will slide over a corresponding ramp or cam-like surface provided in the sleeve 1. As a result, the guide pieces 11 which support the support part 4 is lifted and then lowered in the final phase of the insertion operation. Therefore, the light waveguide end 5 is not longitudinally abutted with the other waveguide but rather transversely introduced into the longitudinal channels 8 during the plug-in operation. As a result of the lateral resiliency, the support part 4 with the light waveguide 5 therefore centers itself in the longitudinal channel 8. The flexible webs 10 which extend parallel to the surface 7 enable the end of the light waveguide 5 to be pressed under tension into the bottom of the longitudinal channel 8 in the coupled condition. The crossridge 12 makes it possible to press a detent surface 3 on each of the guide pieces 11 against the corresponding cooperating stop surface or detent surface under desired pressure and thus secures the parts 2 in the axial position in the sleeve 1. The guide piece is dimensioned with the projections 13 such that an axial parallel position of the support part 4 is guaranteed in the lowered condition. The spacing between the elevations 13 is dimensioned such that they engage the lateral surfaces of the fixed carrier 6.

As best illustrated in FIG. 3, the detent surface or stop surfaces 3 of the two coupling parts 2 engage one another under an axial prestress at the level of the coupling location. The end faces 21 of each of the light waveguides 5 are set back by a slight degree relative to this bearing surface and likewise project by a slight degree beyond the end face 22 of the support parts 4 which are spaced apart an even greater distance. It is thereby guaranteed that no friction which would negatively influence the mobility of the support part 4 occurs between the two adjacent support parts and the ends of the light waveguides 5 during a centering operation.

In a connected condition of the two coupling parts 2 within a coupling part 1, the pair of support parts are accessible from the outside through an opening 17 which is in the area of the fixed carrier 6. By means of a suitable actuation mechanism, the support part 4 can be lifted to remove the waveguide 5 from one of the longitudinal channels 8 and then be laterally displaced and lowered to move the waveguide into the adjacent longitudinal channel 8. The optical connection between the two light waveguide ends can thus be closed or disconnected or uncoupled in this manner. The switch tongues will latch in each of the two selected longitudinal channels as a result of the perpendicular contact pressure. The bi-stable switch thus occurs in which no influence from the outside is necessary between the switching operations. It is also possible to manually actuate the support part 4 by means of a simple tool when the switch status is not to be changed. For example, in a distributor means for a telephone switching center.

Although various minor modifications may be suggested by those versed in the art, it should be understood that we wish to embody within the scope of the patent granted hereon, all such modifications as reasonably and properly come within the scope of our contribution to the art.

We claim:

1. In a switch for coupling and uncoupling a first waveguide from a second waveguide, said switch having means including a fixed carrier part for holding an end of the first waveguide in a fixed position in a switch housing and movable means including a support part for moving an end of a second waveguide between a first position in said housing optically coupled to the first waveguide and a second position uncoupled from said first waveguide, said support part being flexibly connected to the switch housing, the improvement comprising said support part being connected to the switch housing by at least one first flexible web having only one bending axis, said bending axis extending parallel to a waveguide axis of the end of the second waveguide.

2. In a switch according to claim 1, wherein the fixed carrier part comprises a block member having a surface with a plurality of closely adjacent, parallel extending channels for recieving the first and second waveguides, said support part being deflectable both perpendicular and parallel relative to said surface.

3. In a switch according to claim 2, wherein said block member is provided on a first coupling part and said support part is provided on a second coupling part, said coupling parts being designed for one of the first and second coupling parts to plug within the other of the first and second coupling parts.

4. In a switch according to claim 3 which includes a third coupling part constructed the same as the second coupling part, said first coupling part being a sleeve member receiving the second and third coupling parts therein with an end face of said second coupling part being in direct contact with an end face of said third coupling part, and said first coupling part having means forming an access opening for moving said support parts when the first, second and third coupling parts are connected together.

5. In a switch according to claim 2, wherein each of the first flexible webs extend at right angles to said surface and are connected to a second flexible web extending at right angles thereto and parallel to said surface, said second flexible webs bending on an axis extending parallel to the waveguide axis of the second light waveguide adjacent the end thereof.

6. In a switch according to claim 5, wherein the block member is disposed in a first coupling part and the support part is held in a second coupling part, said first and second coupling parts being plugged together to form a plug-type switch.

7. In a switch according to claim 6, which includes a third coupling part identical to said second coupling part, said first coupling part being a sleeve member, said second and third coupling parts being inserted in said sleeve member with their end faces in abutting relationship and said sleeve member having an opening to enable outside access to each of the support parts of said second and third coupling.

8. In a switch according to claim 2, wherein each of the support parts has a surface with at least one longitudinally extending groove facing the surface of the block member, said second waveguide being secured in said longitudinally extending groove of the support part.

9. In a switch according to claim 1, wherein the means for holding the first waveguide comprises a block member having a surface, said flexible webs extending parallel to said surface.

10. In a switch according to claim 1, wherein said means for holding the first waveguide includes a block member having a surface, and said flexible web extending perpendicular to said surface.

11. A switch for coupling and uncoupling a first waveguide with a second waveguide, said switch comprising a housing being formed by a sleeve member having means for holding an end of a first waveguide in a fixed position in the housing, said means for holding including a block member having a surface with a plurality of closely adjacent, parallel extending channels for recieving the first and second waveguides, a coupling part being insertable in said sleeve member, said coupling part having movable means for moving an end of a second waveguide between a first position in one of the channels of the block member optically coupled to the first waveguide and a second position in another of the channels and uncoupled from the first waveguide, said movable means including a support part having a groove receiving an end of the second waveguide and being connected to the coupling part by at least one first web having only one bending axis, said bending axis extending parallel to a waveguide axis of the end of the second waveguide and enabling the support part to be deflected both perpendicularly and parallel relative to the surface of the block member so that the end of the second waveguide can be placed into and out of the one channel in the surface of the block member.

* * * * *